(12) United States Patent
Atad et al.

(10) Patent No.: US 9,715,900 B2
(45) Date of Patent: Jul. 25, 2017

(54) METHODS, CIRCUITS, DEVICES, SYSTEMS AND ASSOCIATED COMPUTER EXECUTABLE CODE FOR COMPOSING COMPOSITE CONTENT

(71) Applicant: Showbox Ltd., Tel-Aviv (IL)

(72) Inventors: Effi Atad, Tel-Aviv (IL); Tomer Afek, Tel-Aviv (IL); Doron Segev, Tel-Aviv (IL); Yaron Waxman, Even-Yehuda (IL); Michael Birnboim, Holon (IL)

(73) Assignee: Showbox Ltd., Tel-Aviv (IL)

( * ) Notice: Subject to any disclaimer, the term of this patent is extended or adjusted under 35 U.S.C. 154(b) by 192 days.

(21) Appl. No.: 14/332,416

(22) Filed: Jul. 16, 2014

(65) Prior Publication Data

US 2015/0332731 A1    Nov. 19, 2015

Related U.S. Application Data

(60) Provisional application No. 61/993,289, filed on May 15, 2014.

(51) Int. Cl.
*G06F 3/0488* (2013.01)
*G11B 27/034* (2006.01)

(52) U.S. Cl.
CPC .................. *G11B 27/034* (2013.01)

(58) Field of Classification Search
CPC .... G06F 17/212; G06F 17/24; G06F 17/2247; G06F 17/248; G11B 27/034
USPC ........................................................ 715/202
See application file for complete search history.

(56) References Cited

U.S. PATENT DOCUMENTS

| | | | | |
|---|---|---|---|---|
| 2002/0002468 | A1* | 1/2002 | Spagna | G06F 21/10 |
| | | | | 713/193 |
| 2003/0163784 | A1* | 8/2003 | Daniel | G06F 17/21 |
| | | | | 715/200 |
| 2005/0102618 | A1* | 5/2005 | Naito | G06F 17/24 |
| | | | | 715/227 |
| 2007/0101259 | A1* | 5/2007 | Grigoriadis | G06F 17/212 |
| | | | | 715/205 |
| 2009/0003794 | A1 | 1/2009 | Heatherly et al. | |
| 2012/0062691 | A1 | 3/2012 | Fowler et al. | |

(Continued)

FOREIGN PATENT DOCUMENTS

WO    WO 2015/173828    11/2015

OTHER PUBLICATIONS

International Search Report and the Written Opinion dated Aug. 11, 2015 from the International Searching Authority Re. Application No. PCT/IL2015/050518.

(Continued)

*Primary Examiner* — Scott Baderman
*Assistant Examiner* — Hassan Mrabi

(57) ABSTRACT

Disclosed are methods, circuits, devices, systems and associated computer executable code for composing composite content. According to embodiments, there is provided an authoring device which may facilitate acquisition or generation of one or more content segments at least partially based on one or more portions of a composite content authoring template. According to further embodiments, content segments produced by the authoring device may be automatically processed in accordance with instructions embedded within the same template used by the authoring device.

14 Claims, 9 Drawing Sheets

(56) References Cited

U.S. PATENT DOCUMENTS

| | | | | |
|---|---|---|---|---|
| 2013/0286018 A1* | 10/2013 | Freyhult | ................ | G09G 5/393 |
| | | | | 345/428 |
| 2013/0294751 A1 | 11/2013 | Maeda | | |
| 2014/0101577 A1* | 4/2014 | Kwak | ................... | G06F 1/1618 |
| | | | | 715/761 |
| 2014/0281907 A1* | 9/2014 | Baldwin | ............. | G06F 17/2247 |
| | | | | 715/234 |
| 2015/0052571 A1* | 2/2015 | Stokking | ............. | H04N 21/242 |
| | | | | 725/116 |

OTHER PUBLICATIONS

International Preliminary Report on Patentability dated Nov. 24, 2016 from the International Bureau of WIPO Re. Application No. PCT/IL2015/050518. (7 Pages).

* cited by examiner

| COMPOSITE CONTENT AUTHORING TEMPLATE ||
|---|---|
| Authoring Device Objects For Content Acquisition of Content & Segment Production With Indicator Coding | System Controller Objects For Postproduction Processing of Content Segments As Part of Composing Complete Work |
| 1. Acquisition Circuit Configuration Parameters<br><br>2. Executable Application Code<br><br>3. User Instructions<br><br>4. Device Operations Values, Constants and/or Parameters<br><br>5. Postproduction Processing Indicators | 1. Content Segment Order<br><br>2. Per Segment Automated Processing (e.g. scene element rendering, scene element morphing, scene element insertion, etc.)<br><br>3. Content Segment Stitching Instructions<br><br>4. Complete Work Finishing Instructions |

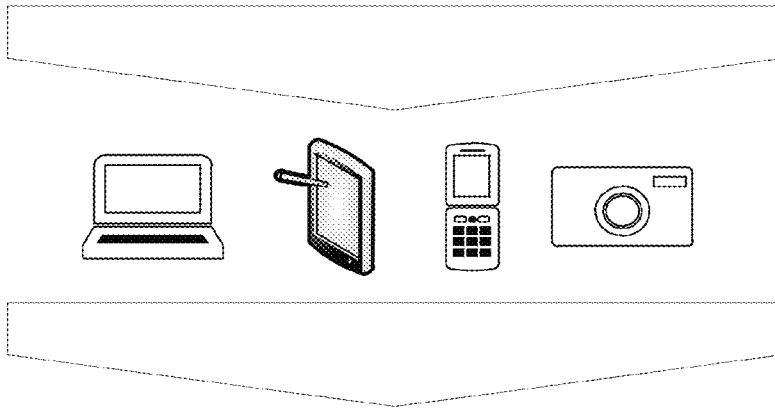

| COMPOSITE CONTENT SEQUENCE AUTHORING INSTRUCTIONS |
|---|
| 1. One or More Content Segments of a Complete Work<br><br>2. Related Metadata<br><br>3. Postproduction Indicators & Markers |

FIG. 2A

METHODS, CIRCUITS, DEVICES, SYSTEMS AND ASSOCIATED COMPUTER EXECUTABLE CODE FOR COMPOSING COMPOSITE CONTENT

PRIORITY CLAIMS

This application claims priority from U.S. Provisional Patent Application No. 61/993,289, filed by the inventors of the present invention, titled "Methods, Circuits, Devices, Systems and Associated Computer Executable Code for Composing Composite Content", filed on May 15, 2014 and which is hereby incorporated by reference in its entirety.

FIELD OF THE INVENTION

Some embodiments relate generally to the field of communication, and more particularly, to methods, circuits, devices, systems and associated computer executable code for composing composite content, which composite content optionally may include some combination of audio, video, computer generated objects and sounds, hyperlinks, etc.

BACKGROUND

Video production and broadcasting has been a pervasive part of the western world since its inception. Image based content production has experienced a long and consistent evolution since its introduction in the mid-19th century, when inventions such as the phenakistoscope and zoetrope demonstrated that a carefully designed sequence of drawings, showing phases of the changing appearance of objects in motion, would appear to show the objects actually moving if they were displayed one after the other at a sufficiently rapid rate. These early devices, like modern devices, relied on the phenomenon of persistence of vision to make the display appear continuous even though the observer's view was actually blocked as each drawing rotated into the location where its predecessor had just been glimpsed. In the late 1870s Eadweard Muybridge created the first animated image sequences photographed in real-time. A row of cameras was used, each in turn capturing one image on a glass photographic plate, so the total number of images in each sequence was limited by the number of cameras, about two dozen at most.

By the end of the 1880s, the introduction of lengths of celluloid photographic film and the invention of motion picture cameras, which could photograph an indefinitely long rapid sequence of images using only one lens, allowed several minutes of action to be captured and stored on a single compact reel of film. Some early films were made to be viewed by one person at a time through a "peep show" device such as the Kinetoscope. Others were intended for a projector, mechanically similar to the camera and sometimes actually the same machine, which was used to shine an intense light through the processed and printed film and into a projection lens so that these "moving pictures" could be shown tremendously enlarged on a screen for viewing by an entire audience. The first public exhibition of projected motion pictures in America was at Koster and Bial's Music Hall in New York City on the 23 of Apr. 1896.

The earliest films were simply one static shot that showed an event or action with no editing or other cinematic techniques. Around the turn of the 20th century, films started stringing several scenes together to tell a story. The scenes were later broken up into multiple shots photographed from different distances and angles. Other techniques such as camera movement were developed as effective ways to tell a story with film. Until sound film became commercially practical in the late 1920s, motion pictures were a purely visual art, but these innovative silent films had gained a hold on the public imagination. Rather than leave audiences with only the noise of the projector as an accompaniment, theater owners hired a pianist or organist or, in large urban theaters, a full orchestra to play music that fit the mood of the film at any given moment. By the early 1920s, most films came with a prepared list of sheet music to be used for this purpose, and complete film scores were composed for major productions.

In the 1920s, the development of electronic sound recording technologies made it practical to incorporate a soundtrack of speech, music and sound effects synchronized with the action on the screen. The resulting sound films were initially distinguished from the usual silent "moving pictures" or "movies" by calling them "talking pictures" or "talkies." The revolution they wrought was swift. By the 1930, silent film was practically extinct in the US and already being referred to as "the old medium". Another major technological development was the introduction of "natural color," which meant color that was photographically recorded from nature rather than added to black-and-white prints by hand-coloring, stencil-coloring or other arbitrary procedures, although the earliest processes typically yielded colors which were far from "natural" in appearance.

The first television broadcast of video was in 1925 by the British Broadcast Corporation. Ever since audio/video was introduced to the masses in the early 1900's, audio/video production techniques and the content formats they produce (audio, video, multimedia, etc.) have continued to rapidly and consistently evolve. Today's audio/video offerings, generally referred to as media, go far beyond the early days of "moving pictures" to include everything from simple audio/video recording to composite real videos with integrated or overlaid digital three dimensional animations, and even tactile and smell sensor stimulation.

Video Production is also known as videography. Technically, it is the process of creating video by capturing moving images, and creating combinations of parts of this video in live production and post-production (video editing). In most cases the captured video will be recorded on electronic media such as video tape, hard disk, or solid state storage, but it might only be distributed electronically without being recorded. It is the equivalent of filmmaking, but with images recorded electronically instead of film stock.

Practically, video production is the art and service of creating content and delivering a finished video product. This can include production of television programs, television commercials, corporate videos, event videos, wedding videos and special-interest home videos. A video production can range in size from a family making home movies with a prosumer camcorder, a one solo camera operator with a professional video camera in a single-camera setup (aka a "one-man band"), a videographer with a sound person, to a multiple-camera setup shoot in a television studio to a production truck requiring a whole television crew for an electronic field production (EFP) with a production company with set construction on the back lot of a movie studio.

Styles or techniques of "shooting" (using a camera to acquire video content) include on a tripod (aka "sticks") for a locked-down shot; hand-held to attain a more jittery camera angle or looser shot, incorporating Dutch angle, Whip pan and whip zoom; on a jib that smoothly soars to varying heights; and with a Steadicam for smooth movement as the camera operator incorporates cinematic techniques moving through rooms. Content can be captured and produced according to a large and ever-growing number of audio/video formats or schemes. There is also an extensive and ever-growing set of techniques for both video acquisition and editing, where each technique is designed and intended to evoke a specific set of sensations or feelings within a viewer. Most content formats and acquisition/editing techniques are taught in film/video production courses or may be learned from textbooks on the subject. However, to date, there is no system or software which allows a layman or novice to produce audio/video content according to a preselected format and/or style.

SUMMARY OF THE INVENTION

The present invention includes methods, circuits, apparatuses, systems and associated computer executable code for authoring and/or otherwise composing composite content including audio/video content, multimedia content, mixed-media content and/or any other content form known today or to be devised in the future. According to some embodiments, composed content may be composite content including multiple content elements grouped and/or bundled into each of one or more content segments, which content segments may either be generated or acquired from a variety of different content sources, including from one or more content authoring devices operated by a user. According to embodiments, content elements and/or content segments, irrespective of their origin, may be modified, enhanced, blended, stitched and/or otherwise processed by one or more automated content processing tools, wherein generating, acquiring and/or processing of content elements or content segments into a composite work may be at least partially automated and/or directed pursuant to a Composite Content Authoring Template (CCAT). Accordingly, a user may generate a complete creative work of a given composite work format, including multiple content segments, each of which segments may include multiple content elements, each of which content elements may be either acquired (i.e. image or sound capture) or computer generated, by: (1) selecting a CCAT associated with the given composite work format in accordance with embodiments of the present invention, and (2) operating a system according to embodiments of the present invention using the selected CCAT.

According to embodiments, a given CCAT may include Content Acquisition Object(s) (CAQOs) in the form of data or code provided to and used by one or more Authoring Devices to acquire or otherwise generate content elements. The given CCAT may also include Content Processing Object(s) (CPOs) in the form of data or code provided to and used by one or more Content Processing Tools to process (e.g. augment, enhance, morph, blend, stitch, etc.) acquired or otherwise generated content elements. Each one from a set of CCATs may be associated with a different Composite Work Format (CWF), for example, a given CCAT may define a set and sequence of content elements for the production of a television program format, such as: (1) a morning talk-show, (2) a reality show, (3) a game show, (4) a music video, etc.

A given CCAT of a given CWF may include Content Authoring Object(s) (CAOs) designed or selected to facilitate or drive a process of content acquisition, at one or more Authoring Devices, for content associated with the given CWF. According to further embodiments, one or more CAOs associated with a given portion or segment of content to be generated using a CCAT of a given CWF may include user instructions indicating to a user how to operate the Authoring Device, what content to generate or acquire at the Authoring Device, and/or how to setup objects or direct 'actors' in the environment, during content acquisition for the given portion or segment of content.

A given CCAT for a given CWF may define, list or otherwise indicate a set of content elements to be acquired or generated by a user at the Authoring Device, and/or by an automated Content Processing Tool, for embedding into a composite work to be composed according to the CCAT. The CCAT may include one or more CAQOs defining instructions to an Authoring Device, and/or one or more CAOs defining instructions to a user of an Authoring Device for acquiring and/or generating one or more of the content elements associated with the one or more CAQOs.

According to some embodiments, content elements to appear in temporal proximity with one another within a given composite work produced according to a CCAT specific to a format of the given composite work, may be grouped into and arranged within a given content segment of the composite work. Instructions for acquiring, generating and/or arranging content elements within the given content segment may be provided by one or more authoring device CAQOs and/or one or more authoring device user CAOs included within a CCAT portion associated with the given content segment. Instructions for processing acquired or otherwise generated content elements within the given content segment may be provided by one or more CPOs included within a CCAT portion associated with the given content segment.

According to some embodiments, there may be provided a Composite Content Production System ("System"), including a set of Content (e.g. video/audio) Composing Tools and an Interpreter Module adapted to interpret Composite Content Sequence Authoring Instructions (CCSAI) generated at one or more Authoring Devices, which CCSAI may be in the form of a data file, data stream, data structure and/or other data objects. In addition to containing instructions for content authoring by the System, the CCSAI may either include or reference Constituent Content Data (CCD) such as images, skins, textures, video frames, etc. to be incorporated into a Composite Work (CW) whose general structure or framework is defined by a Composite Content Authoring Template (CCAT).

According to embodiments, a given CCSAI may be generated using one or more computerized authoring devices or platforms. Each of the one or more computerized authoring devices used to generate at least some portion of the given CCSAI may be at least partially operated using or guided according to a common CCAT, the template of the given CCSAI. The CCSAI template may include executable code for execution on the one or more devices, configuration parameters to be used by an application running on the one or more devices, template sounds and images, scripts to be read, instructions to a device user, and/or any other data that may be utilizable by a computerized authoring device or platform, and/or user(s) thereof, for facilitating the authoring and/or composing of composite content.

According to some embodiments, the Interpreter may include or be otherwise functionally associated with a Content Processing Tool Launcher ("CPTL"), which CPTL may call, activate, instance or otherwise launch one or more content processing tools from a set of available Content Processing Tools. The interpreter module, the launcher, or another functionally associated software component may provide a given launched composition tool with one or more content composing instructions embedded in the CCSAI and relevant to the given launched composing tool. Some or all of the content processing tools may be adapted to receive a segment of the CCSAI relevant to the respective tool and further to receive CCD such as images, skins, textures, video frames, etc. referenced with the received CCSAI segment. According to further embodiments, CCD received by one video composition tool may be the output of another video composition tool. The CCSAI may define a sequence and/or order of video composition tool launchings and may further define flow of data between two or more content composition tools.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

FIG. 2A includes diagrams depicting exemplary data structures for an exemplary composite content authoring template (CCAT) and an exemplary composite content sequence authoring instructions (CCSAI), according to some embodiments of the present invention;

Figure 1A:
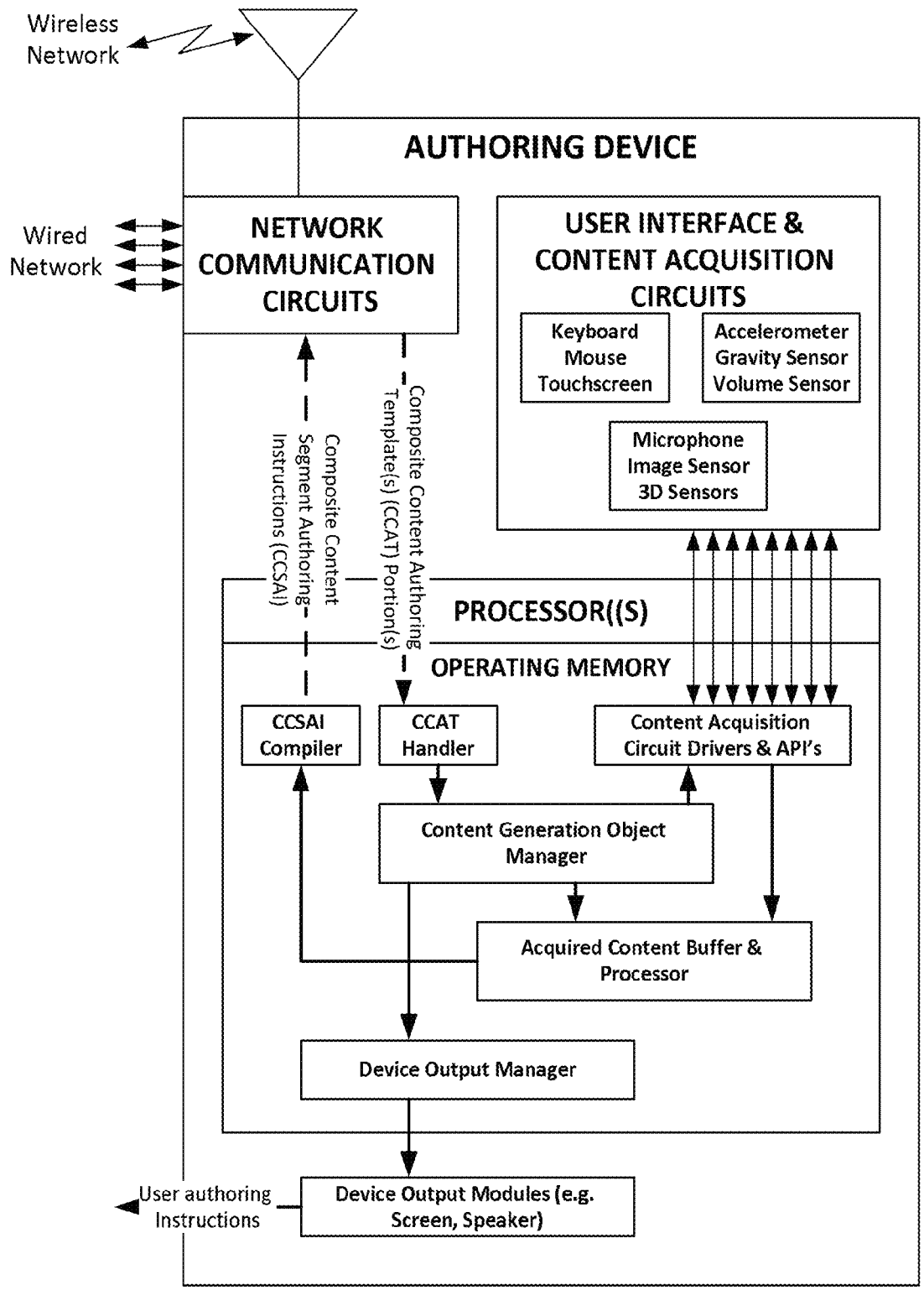
FIG. 1A is a functional block diagram of an exemplary computing and/or communications device configured to operate as an authoring device according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Unless specifically stated otherwise, as apparent from the following discussions, it is appreciated that throughout the specification discussions utilizing terms such as "processing", "computing", "calculating", "determining", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

It should be understood that some embodiments may be used in a variety of applications. Although embodiments of the invention are not limited in this respect, one or more of the methods, devices and/or systems disclosed herein may be used in many applications, e.g., civil applications, military applications, medical applications, commercial applications, or any other suitable application. In some demonstrative embodiments the methods, devices and/or systems disclosed herein may be used in the field of consumer electronics, for example, as part of any suitable television, video Accessories, Digital-Versatile-Disc (DVD), multimedia projectors, Audio and/or Video (A/V) receivers/transmitters, gaming consoles, video cameras, video recorders, portable media players, cell phones, mobile devices, and/or automobile A/V accessories. In some demonstrative embodiments the methods, devices and/or systems disclosed herein may be used in the field of Personal Computers (PC), for example, as part of any suitable desktop PC, notebook PC, monitor, and/or PC accessories. In some demonstrative embodiments the methods, devices and/or systems disclosed herein may be used in the field of professional A/V, for example, as part of any suitable camera, video camera, and/or A/V accessories. In some demonstrative embodiments the methods, devices and/or systems disclosed herein may be used in the medical field, for example, as part of any suitable endoscopy device and/or system, medical video monitor, and/or medical accessories. In some demonstrative embodiments the methods, devices and/or systems disclosed herein may be used in the field of security and/or surveillance, for example, as part of any suitable security camera, and/or surveillance equipment. In some demonstrative embodiments the methods, devices and/or systems disclosed herein may be used in the fields of military, defense, digital signage, commercial displays, retail accessories, and/or any other suitable field or application.

Although embodiments of the invention are not limited in this respect, one or more of the methods, devices and/or systems disclosed herein may be used to transmit video signals, for example, High-Definition-Television (HDTV) signals, between at least one video source and at least one video destination. In other embodiments, the methods, devices and/or systems disclosed herein may be used to transmit, in addition to or instead of the video signals, any other suitable signals, for example, any suitable multimedia signals, e.g., audio signals, between any suitable multimedia source and/or destination.

Some embodiments of the invention, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments of the invention may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

The present invention includes methods, circuits, apparatuses, systems and associated computer executable code for authoring and/or otherwise composing composite content including audio/video content, multimedia content, mixed-media content and/or any other content form known today or to be devised in the future. According to some embodiments, composed content may be composite content including multiple content elements grouped and/or bundled into each of one or more content segments, which content segments may either be generated or acquired from a variety of different content sources, including from one or more content authoring devices operated by a user. According to some embodiments, content elements and/or content segments, irrespective of their origin, may be modified, enhanced, blended, stitched and/or otherwise processed by one or more automated content processing tools, wherein generating, acquiring and/or processing of content elements or content segments into a composite work may be at least partially automated and/or directed pursuant to a Composite Content Authoring Template (CCAT). Accordingly, a user may generate a complete creative work of a given composite work format, including multiple content segments, each of which segments may include multiple content elements, each of which content elements may be either acquired (i.e. image or sound capture) or computer generated, by: (1) selecting a CCAT associated with the given composite work format in accordance with embodiments of the present invention, and (2) operating a system according to embodiments of the present invention using the selected CCAT.

According to embodiments, a given CCAT may include Content Acquisition Object(s) (CAQOs) in the form of data or code provided to and used by one or more Authoring Devices to acquire or otherwise generate content elements. The given CCAT may also include Content Processing Object(s) (CPOs) in the form of data or code provided to and used by one or more Content Processing Tools to process (e.g. augment, enhance, morph, blend, stitch, etc.) acquired or otherwise generated content elements. Each one from a set CCATs may be associated with a different Composite Work Format (CWF), for example, a given CCAT may define a set and sequence of content elements for the production of a television program format, such as: (1) a morning talk-show, (2) a reality show, (3) a game show, (4) a music video, etc.

A given CCAT of a given CWF may include Content Authoring Object(s) (CAOs) designed or selected to facilitate or drive a process of content acquisition, at one or more Authoring Devices, for content associated with the given CWF. According to further embodiments, one or more CAOs associated with a given portion or segment of content to be generated using a CCAT of a given CWF may include user instructions indicating to a user how to operate the Authoring Device, what content to generate or acquire at the Authoring Device, and/or how to setup objects or direct 'actors' in the environment, during content acquisition for the given portion or segment of content.

A given CCAT for a given CWF may define, list or otherwise indicate a set of content elements to be acquired or generated by a user at the Authoring Device, and/or by an automated Content Processing Tool, for embedding into a composite work to be composed according to the CCAT. The CCAT may include one or more CAQOs defining instructions to an Authoring Device, and/or one or more CAOs defining instructions to a user of an Authoring Device for acquiring and/or generating one or more of the content elements associated with the one or more CAQOs. Acquisition or generation of one or more content elements at a Content Authoring Device (CAD) may include: (1) using one or more audio and/or video acquisition circuits functionally associated the CAD, (2) accessing pre-recorded content using the CAD, optionally through the internet, (3) receiving user input (e.g. textual input, audible input or graphical input) through a user input peripheral functionally associated with the CAD, and/or (4) receiving content elements acquired or generated at one or more separate acquiring device(s) and shared, optionally through the internet, with the CAD, wherein the separate acquiring device(s) may, or may not, be a CAD (i.e. run authoring application and/or posses the CCAT). A given CCAT may also define or otherwise indicate an order, sequence, timing and/or placement of content elements within a portion or segment of a composite work to be composed or produced using the given CCAT.

According to some embodiments, content elements to appear in temporal proximity with one another within a given composite work produced according to a CCAT specific to a format of the given composite work, may be grouped into and arranged within a given content segment of the composite work. Instructions for acquiring, generating and/or arranging content elements within the given content segment may be provided by one or more authoring device CAQOs and/or one or more authoring device user CAOs included within a CCAT portion associated with the given content segment. Instructions for processing acquired or otherwise generated content elements within the given content segment may be provided by one or more CPOs included within a CCAT portion associated with the given content segment. CPOs associated with the given content segment may also include instructions for generating, adding, removing and/or modifying (e.g. background removal, background replacement, computer generated characters, etc.) one or more content elements within the given content segment. CPOs associated with the given content segment may also include instructions for splicing, stitching and/or blending the given content segment with another content segment.

A portion or a complete content segment of a composite creative work of a specific CWF may be produced at a given CAD, using various input devices associated with, and/or integrated into, the CAD, in accordance with device and/or user instructions contained within one or more CAQOs and/or CAOs included with a portion of a CCAT for the CWF and received at the CAD. The content segment may include content elements, such as images, videos, audios, text, etc. acquired at the CAD in accordance with acquisition instructions or parameters provided to the CAD and/or to the CAD user. According to further embodiments, a content segment may include markers, metadata and/or other indicators, such a timing markers, content element identifiers and/or content segment identifiers, which indictors may be optionally defined by the CAQOs and/or CAOs used to generate the content segment. The content segment indicators may be embedded by the CAD and used by one or more (e.g. downstream) content processing tools for subsequent automated processing of the content segment, wherein content segment processing may include the addition, modification and/or removal of content elements or portions thereon. Content segment processing may also include stitching and/or blending of one content segment with one or more other content segments.

An exemplary CCAT according to embodiments may also define or otherwise include (post-acquisition) processing instructions, optionally in the form of one or more CPOs, for driving or guiding one or more automated content processing tools to process (e.g. add, modify, remove, blend, stitch, etc.) one or more content elements. One or more content elements, optionally embedded within a content segment, being processed by a given content processing tool (e.g. scene background replacement) may have been acquired and/or generated by or through a CAD, and/or by another content processing tool. According to some embodiments, the processing instructions within a CCAT may be in a form of one or more CPOs, and each of the one or more CPOs may be applicable to either a single or to multiple content elements, or optionally to an entire content segment.

According to some embodiments, for a given creative work produced using and based upon a given CCAT, content element acquisition and/or content authoring (which terms are generally associated herein with Device directed and User directed instructions, respectively, may be used, however, interchangeably) may be performed at each of a set of devices, wherein some of the devices may not be authoring devices. For example, some content elements may be downloaded from a conventional storage device such as a local drive or remote storage such as a remote server. Additionally, content elements acquired by conventional audio and/or video acquisition devices, optionally in accordance with user instructions provided within a CCAT, may be sent to a CAD or to a Content Production System operating according to some embodiments.

According to some embodiments, for a given creative work produced using and based upon a given CCAT, content element processing and/or content segment processing may be performed across a set of devices, not only by the content processing tools of the Content Production System. For example, a CCAT portion sent to an authoring device may include both CAQOs, CAOs and CPO's, such that content elements acquired or otherwise received at the CAD in accordance with the CAQOs/CAOs may also be processed (e.g. morphed, enhanced, blended, blurred, compressed, etc.) by data processing circuits of the CAD in accordance with the CPOs.

According to some embodiments, there may be provided a Composite Content Production System ("System"), including a set of Content (e.g. video/audio) Composing Tools and an Interpreter Module adapted to interpret Composite Content Sequence Authoring Instructions (CCSAI) generated at one or more Authoring Devices, which CCSAI may be in the form of a data file, data stream, data structure and/or other data objects. In addition to containing instructions for content authoring by the System, the CCSAI may either include or reference Constituent Content Data (CCD) such as images, skins, textures, video frames, etc. to be incorporated into a Composite Work (CW) whose general structure or framework is defined by a Composite Content Authoring Template (CCAT).

According to embodiments, a given CCSAI may be generated using one or more computerized authoring devices or platforms. Each of the one or more computerized authoring devices used to generate at least some portion of the given CCSAI may be at least partially operated using or guided according to a common CCAT, the template of the given CCSAI. The CCSAI template may include executable code for execution on the one or more devices, configuration parameters to be used by an application running on the one or more devices, template sounds and images, scripts to be read, instructions to a device user, and/or any other data that may be utilizable by a computerized authoring device or platform, and/or user(s) thereof, for facilitating the authoring and/or composing of composite content.

According to some embodiments, the Interpreter may include or be otherwise functionally associated with a Content Processing Tool Launcher ("CPTL"), which CPTL may call, activate, instance or otherwise launch one or more content processing tools from a set of available Content Processing Tools. The interpreter module, the launcher, or another functionally associated software component may provide a given launched composition tool with one or more content composing instructions embedded in the CCSAI and relevant to the given launched composing tool. The set of content composing tools may include a video rendering tool, a video overlay tool, a video blending tool, a video stitching tool, a video morphing tool, a video stitching tool, visual effects and motion graphics tools, CGI tools, and/or any other content composing or processing tool known today or to be devised in the future. Some or all of the content processing tools may be adapted to receive a segment of the CCSAI relevant to the respective tool and further to receive CCD such as images, skins, textures, video frames, etc. referenced with the received CCSAI segment. According to further embodiments, CCD received by one video composition tool may be the output of another video composition tool. The CCSAI may define a sequence and/or order of video composition tool launchings and may further define flow of data between two or more content composition tools.

According to further embodiments, there may be provided a CCSAI authoring application. The authoring application may provide a user interface and a computational framework for authoring one or more individual segments of a CCSAI. Additionally, the authoring application may provide access to one or more CCAT, wherein a CCSAI template may include two or more template video composition segments. Each of at least two or more of the template segments may include different Composite Video Sequence Authoring Instructions (CVSAIs) adapted to trigger the launch of a different video composition tool and to provide its respective launched video composition tool with at least partial template CCD relevant to the template segment and to the launched tool.

According to some embodiments, portions of the CCSAI may be generated by different devices. Different CCSAI portions may be allocated for generation/authoring based on the portions of, or indications provided as part of, a CCAT. Some or all of the portions of a CCAT may include respective generation/authoring instructions distributable between multiple different devices for generation.

According to embodiments of the present invention, the Authoring Device may be a Personal Computer, Cellular Phone, Smart-Phone, Personal Digital Assistant ("PDA"), Laptop Computer, Tablet, E-Book reader and/or any hybrid or variation thereof. According to some embodiments of the present invention, at least some portions of content elements, content segments and/or composite works may be generated and/or processed using computational resources such as central processing unit (CPU), graphics processing unit (GPU), digital signal processor (DSP), application processor, and the like. According to further embodiments of the present invention, at least some portions of a content element, content segments or composite work may be stored, generated, transmitted and/or received by functional elements of the system in varied digital forms, including but not limited to Uncompressed Video, MPEG-4 and/or H.264.

According to embodiments of the present invention, the Composite Content Production System may be implemented as one or more Composite Content Production Servers. According to some embodiments, some or all of the functionalities of a Composite Content Production System ("System")—for example some or all of the system's content processing or instructions interpretation functionalities—may be distributed between multiple Servers, and/or one or more Servers and additional computerized device(s) (e.g. CADs).

In FIG. 1A there is shown a functional block diagram of an exemplary computing and/or communications device configured to operate as an authoring device according to some embodiments of the present invention. CCATs are received through Network Communication Circuits of the Authoring Device. Received CCATs go through a pre-processing Handler and are relayed to a Content Generation Object Manager that manages the execution of acquisition, authoring and/or processing objects contained in the CCAT. The Content Generation Object Manager utilizes Content Acquisition Circuit Drivers and API's to operate Authoring Device User Interface and Content Acquisition Circuits in order to acquire content in accordance with the CCAT's objects, and buffering acquired content at an Acquired Content Buffer and Processor. The Content Generation Object Manager further utilizes a Device Output Manager to operate one or more Output Circuits (e.g. screen, speaker) of the Authoring Device in order to provide user authoring guidance and instructions to the Authoring Device user in accordance with the CCAT's objects. Acquired, buffered and processed content, and possibly CCAT's objects for downstream handling and execution, is compiled by a CCSAI Compiler into instructions relayed to the Network Communication Circuits of the Authoring Device for communication to one or more Composite Content Production Servers.

Figure 1B:
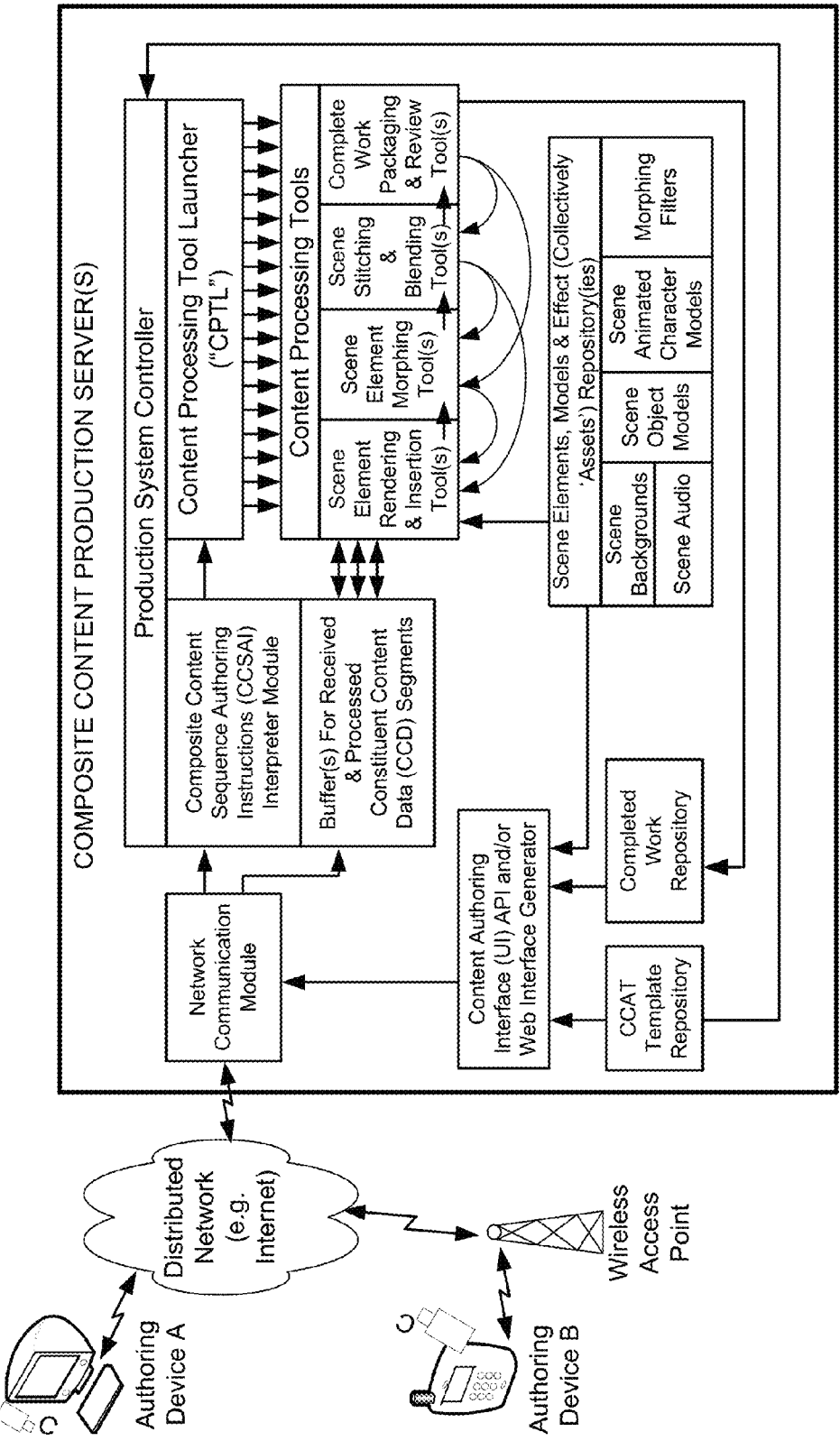
FIG. 1B is a functional block diagram of a system according to an exemplary embodiment, wherein the system includes a set of authoring devices communicatively coupled to a composite content production server, both of which are configured and operate in accordance with embodiments of the present invention.

In FIG. 1B there is shown a functional block diagram of a system according to an exemplary embodiment, wherein the system includes a set of authoring devices communicatively coupled to a composite content production server, both of which are configured and operate in accordance with embodiments of the present invention. CCSAIs from Authoring Devices are received through the system's Network Communication Module and relayed to a CCSAI Interpreter Module while CCDs received as part of the CCSAIs, or later processed by the system's processing tools, is Buffered. Interpreted CCSAI instructions are relayed to a CPTL. Content Processing Tools receiving CCSAI based instructions from the CPTL, and having access to Received and Processed CCD segments and to Scene Elements, Models and Effect Repository(ies), perform various processing procedures on the CCDs. Post processed content is stored at a Completed Work Repository for later Network Communication to Authoring Device(s), or Presentation over an Authoring Device Interface. The System further includes a CCAT Template Repository for Authoring Devices to select/interface/download CCATs to be used for CCSAI generation.

In FIG. 2A there are shown diagrams depicting exemplary data structures for an exemplary composite content authoring template (CCAT) and an exemplary composite content sequence authoring instructions (CCSAI), according to some embodiments of the present invention. Based on a CCAT, communicated to or accessed by the Authoring Devices, and including: authoring device and device user objects for content acquisition and segment production with indicator coding, and system controller objects for postproduction processing of content segments as part of composing complete work; a set of CCSAI is compiled. The compiled CCSAI may then be communicated to a Composite Content Production System for Content Processing.

Figure 2B:
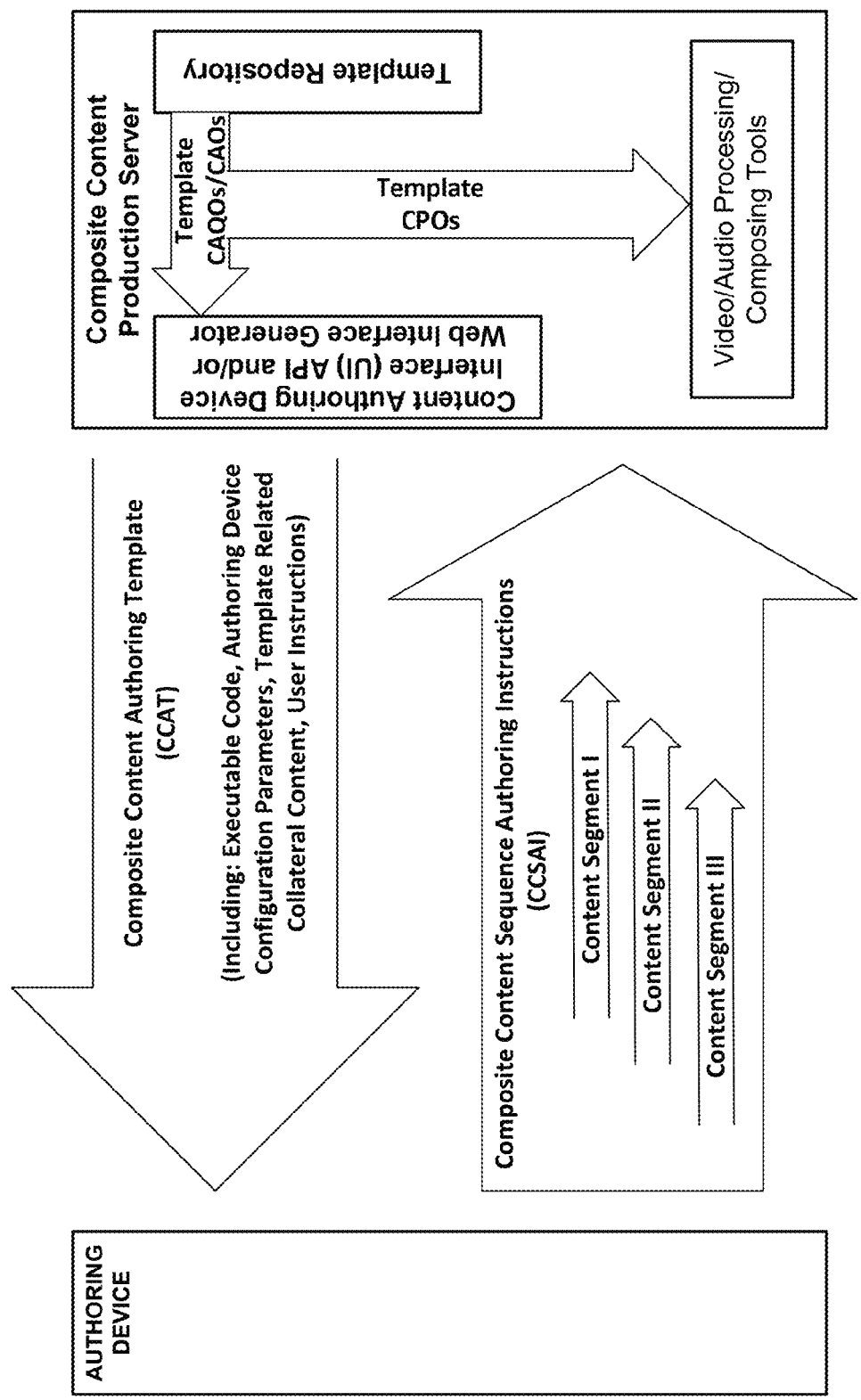
FIG. 2B is a functional block diagram illustrating an exemplary exchange of information between a production server and an authoring device, during composite content production, according to some embodiments of the present invention.

In FIG. 2B there is shown a functional block diagram illustrating an exemplary exchange of information between a production server and an authoring device, during composite content production, according to some embodiments of the present invention. In response to a CCAT being selected/requested by a CAD interfacing with a Composite Content Production Server through the server's Content Authoring Device Interface (UI) API and/or Web Interface Generator, CAQOs and CAOs associated with the selected CCAT are retrieved from a Template (CCATs) Repository and relayed to the Authoring Device. The authoring device, and its user, utilizes the CAQOs and CAOs including: Authoring Device Executable Code, Authoring Device Configuration Parameters, Template Related Collateral Content, and User Instructions; to acquire, author, and process content. The acquired, authored, and processed content is segmented and relayed back to the Composite Content Production Server as a CCSAI including a sequence of CW content segments for processing/composing (e.g. video and audio) based on CPOs associated with the selected/requested CCAT.

Figure 2C:
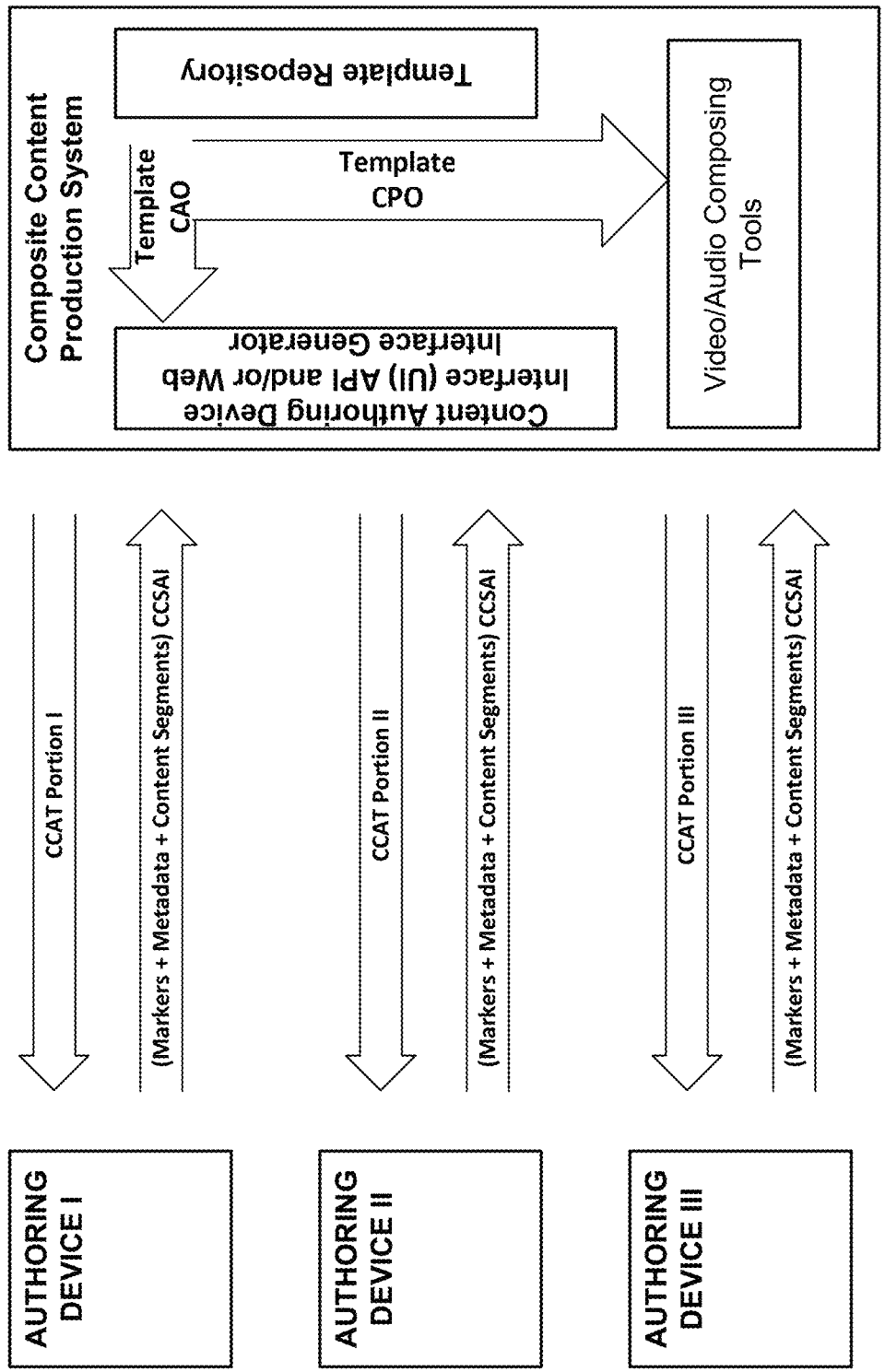
FIG. 2C is a functional block diagram illustrating an exemplary exchange of information between a production server and a set of authoring devices, during composite content production, according to some embodiments of the present invention.

In FIG. 2C there is shown a functional block diagram illustrating an exemplary exchange of information between a production server and a set of authoring devices, during composite content production, according to some embodiments of the present invention. Portions of the CCAT, associated with respective CW content segments, are distributed between multiple Authoring Devices. Each of the Authoring Devices acquires, authors, and processes content based on the CCAT portion it received, and relays the respective content segment it generated, along with related markers and metadata, back to the Composite Content Production Server as a segment specific CCSAI.

Figure 2D:
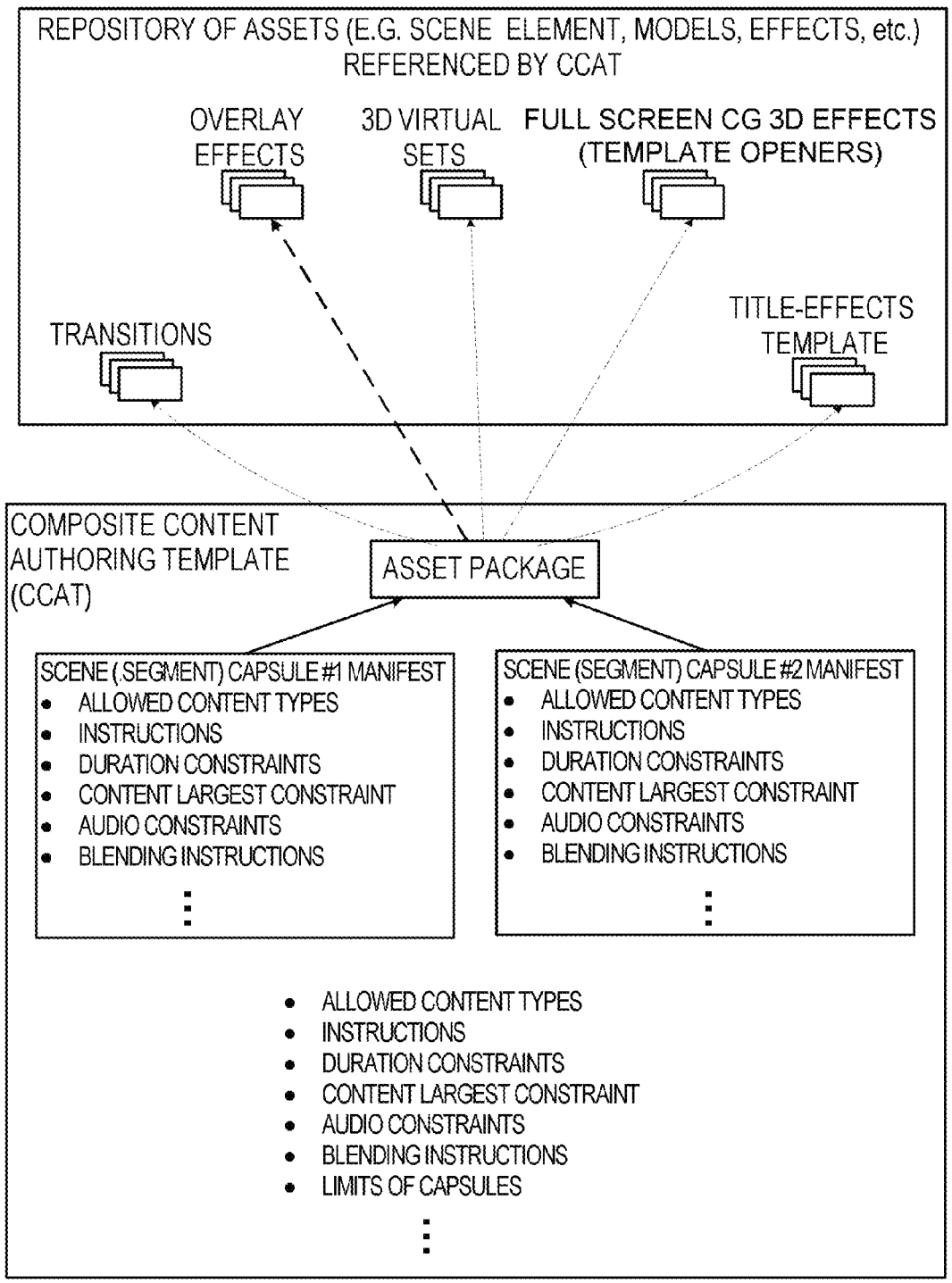
FIG. 2D is a functional block diagram illustrating an exemplary CCAT based reference of an Asset Repository containing scene elements, models, effects and the like, according to some embodiments of the present invention.

In FIG. 2D there is shown a functional block diagram illustrating an exemplary CCAT based reference of an Asset Repository containing scene elements, models, effects and the like, according to some embodiments of the present invention. The CCAT shown contains an asset-related data manifest for the entire work (i.e. entire CCAT) and an encapsulated asset-related data manifest for each of the scenes (i.e. CCAT segments) in the work. Exemplary asset-related data types shown include: allowed content types, instructions, duration constrains, largest content constrain, audio constrains, and blending instructions—in each capsule, and for the entire work, and further asset-related data associated with the entire work such as the limit number of capsules and/or their order. Based on all asset-related data in the CCAT, a CCAT specific Asset Package is generated.

Figure 2E:
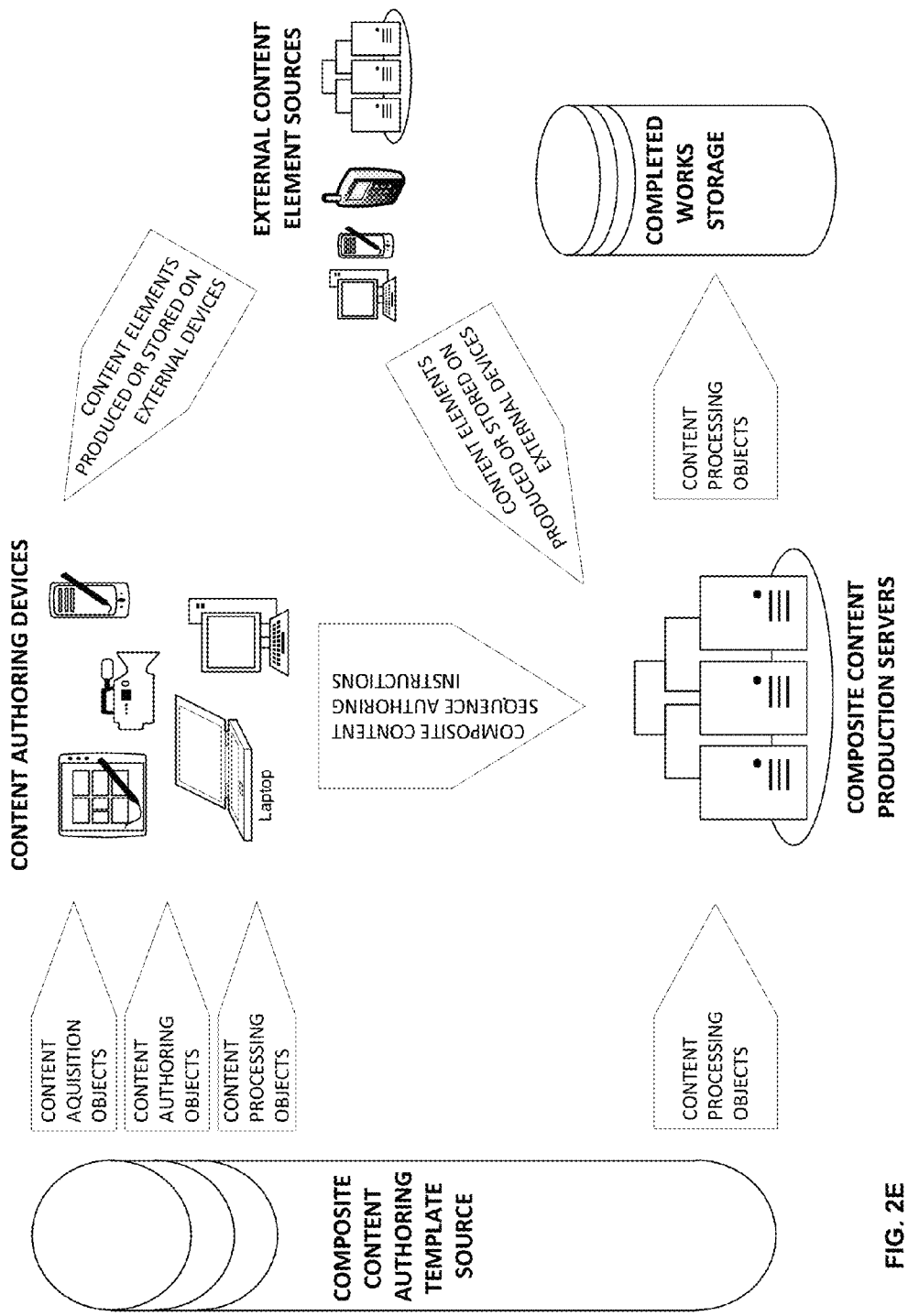
FIG. 2E is a functional block diagram illustrating an exemplary configuration of a distributed Content Authoring System, according to some embodiments of the present invention.

In FIG. 2E there is shown a functional block diagram illustrating an exemplary configuration of a distributed Content Authoring System, according to some embodiments of the present invention. Based on content acquisition objects, content authoring objects and content processing objects of a CCAT stored on a Source, and using self produced content elements and content elements produced by, or stored on, external devices; Content Authoring Devices generate a CCSAI relayed to Composite Content Production Servers. Using the generated CCSAI, further CCAT content processing objects stored on the source and content elements from external devices, and utilizing their content processing tools; Composite Content Production Servers generate the final composite work and store it to a Completed Work Storage, possibly with additional associated content processing objects, such as postproduction processing related objects.

Figure 3A:
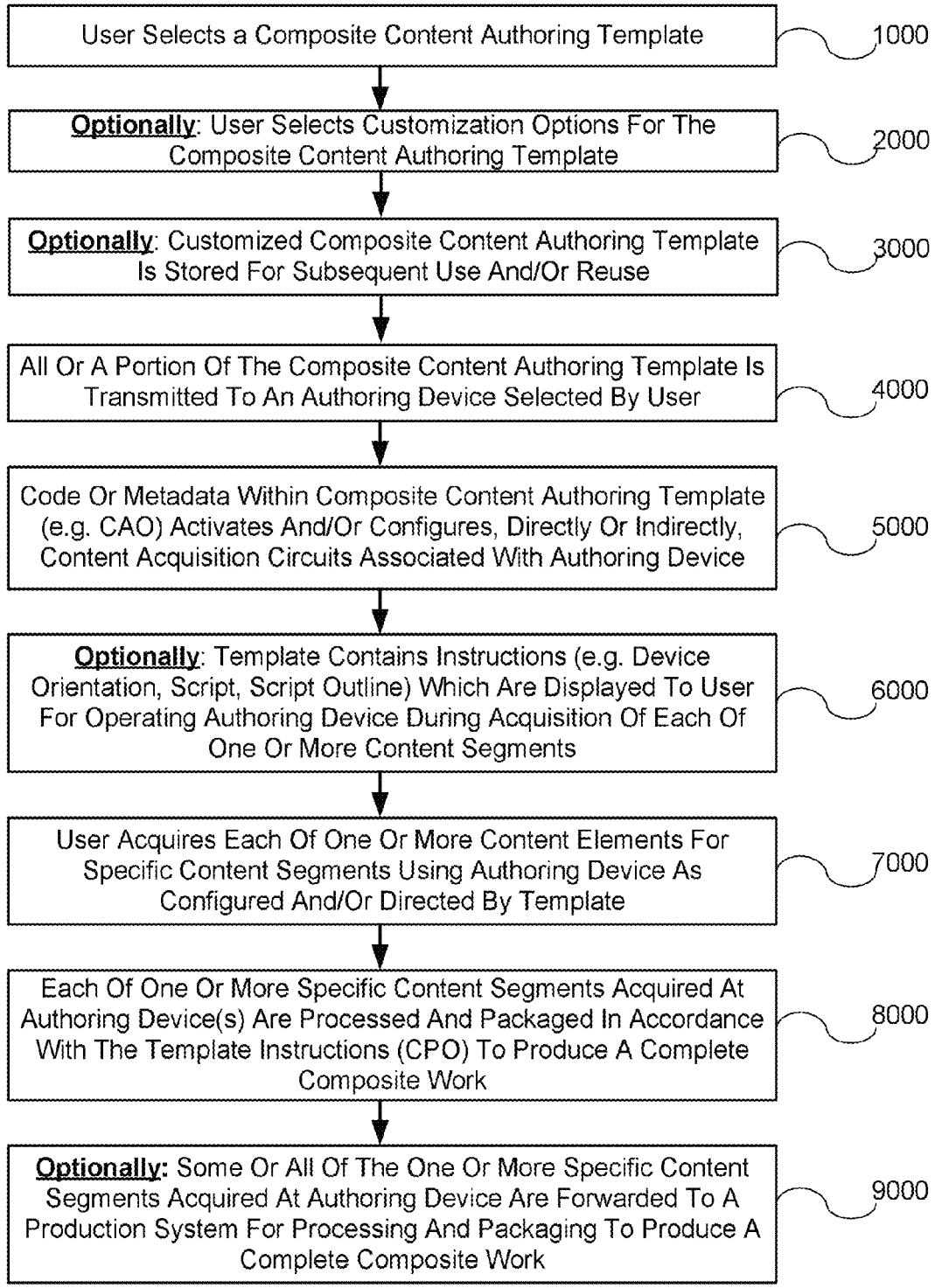
FIGS. 3A-3C are flowcharts including the main processes and steps of an exemplary method for composing/producing composite content, according to some embodiments of the present invention.
Figure 3B:
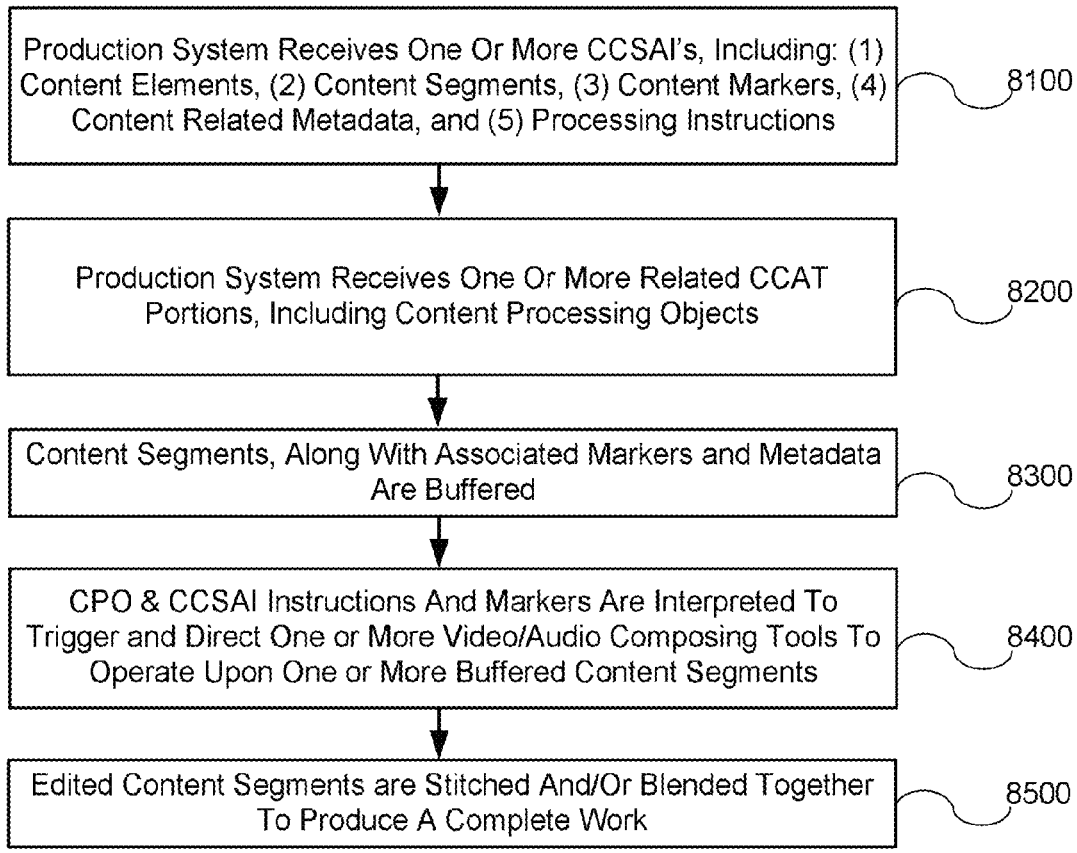
Figure 3C:
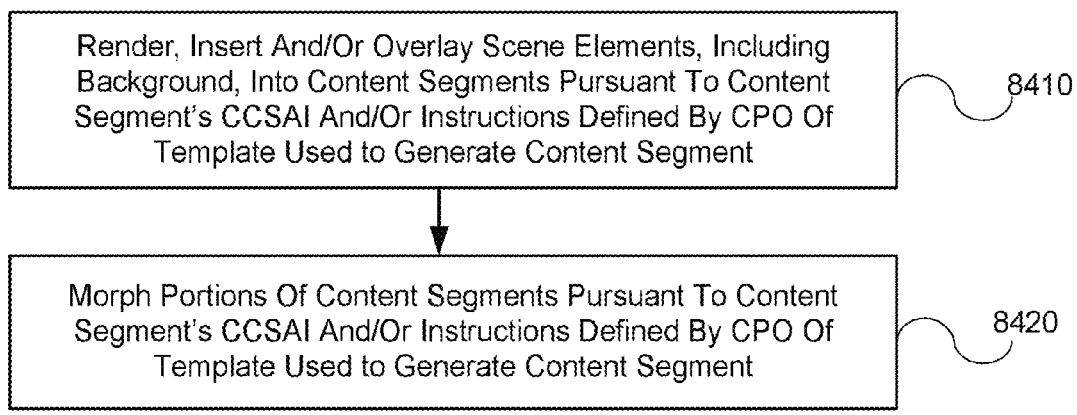

FIGS. 3A-3C are flowcharts including the main processes and steps of an exemplary method for composing/producing composite content, according to some embodiments of the present invention.

In FIG. 3A steps executed by, and/or associated with, an exemplary Authoring Device and/or user thereof, in accordance with some embodiments of the present invention, are shown. Initially, a user selects a CCAT (1000), and optionally selects customization options for the CCAT (2000). The customized CCAT is optionally stored for subsequent use and/or reuse (3000). All, or a portion of, the CCAT is then transmitted to an Authoring Device selected by the user (4000). Code and/or metadata within the CCAT (e.g. CAQOs) activate and/or configure, directly or indirectly, content acquisition circuits associated with Authoring Device (5000). The Template optionally contains instructions (e.g. CAOs such as: device orientation, script, script outline) which are displayed to the Authoring Device user for operating the authoring device during acquisition of each of one or more content segments (6000). The user then acquires each of one or more content elements for specific content segments using the Authoring Device as configured and/or directed by the Template (7000). Each of one or more specific content segments acquired at the Authoring Device(s) are processed and packaged in accordance with the template instructions (e.g. CPOs) to produce a complete Composite Work (8000). Some or all of the one or more specific content segments acquired at the Authoring Device are forwarded to a Production System for processing and packaging to produce a complete Composite Work (9000).

In FIG. 3B steps executed by, and/or associated with, an exemplary Production System and/or user thereof, in accordance with some embodiments of the present invention, are shown. The Production System initially receives one or more CCSAIs, Including: (1) content elements, (2) content segments, (3) content markers, (4) content related metadata, and (5) processing instructions (8100). The Production System then receives one or more Related CCAT portions, including CPOs (8200). Content segments, along with associated markers and metadata are buffered (8300). CPO & CCSAI instructions and markers are interpreted to trigger and direct one or more video/audio Processing/Composing Tools to operate upon one or more buffered content segments (8400). Edited content segments are stitched and/or blended together to produce a complete Composite Work (8500).

In FIG. 3C steps executed by, and/or associated with, Processing/Composing Tools of an exemplary Production System, in accordance with some embodiments of the present invention, are shown. Processing/Composing Tools render, insert and/or overlay scene elements, including background, into content segments pursuant to the content segment's CCSAI and/or instructions defined by CPOs of the CCAT Used to generate the content segment (8410). Processing/Composing Tools morph portions of content segments pursuant to the content segment's CCSAI and/or instructions defined by CPOs of the CCAT used to generate the content segment (8420).

According to some embodiments of the present invention, a method for composing composite content in accordance with a composite content authoring template, may comprise: providing to an authoring device at least a portion of the Composite Content Authoring Template (CCAT), wherein the CCAT portion is associated with a given content segment type from a set of possible content segment types and includes one or more Content Acquisition Objects (CAQOs) and one or more Content Authoring Objects (CAOs) and is adapted to facilitate acquisition, at the authoring device, of content corresponding to the given content segment type; producing at least one content segment using the received one or more CCAT portions; associating to a given content segment one or more processing indicators defined by the CCAT portion used in producing the given content segment; and performing automated postproduction processing of each of one or more produced content segments at least partially based on their respective processing indicators.

According to some embodiments, the one or more CAQOs and CAOs may be selected from a group of objects consisting of: (1) constant values, (2) operational variables, (3) executable code, (4) interpreted code, (5) device parameters, (6) written user instructions, (7) audible user instructions or cues, and (8) graphical or video based user instructions.

According to some embodiments, content acquisition may include: (1) acquiring images through an authoring device camera, (2) acquiring images through a camera functionally associated with an authoring device, (3) acquiring audio through an authoring device microphone, (4) receiving user text or graphic input through user interface of the authoring device, and (5) acquiring a user input through any sensor associated with the authoring device.

According to some embodiments, the one or more processing indicators associated with a content segment may be selected from a group consisting of: (1) metadata, (2) watermarks, (3) audio or video segment timing markers, (4) a filename, (5) a file designator, (6) a pointer, (7) an image processing designator or instruction, (8) an image stitching designator or instruction, (9) a rendered object designator or placeholder, and (10) an image overlay designator or instruction.

According to some embodiments, automated post production processing of one or more content segments may include: (1) content segment stitching, (2) content segment element extraction from background, (3) content segment element morphing, (4) content segment element blending, (5) content segment element rendering and/or augmentation, (6) content segment background rendering and/or augmentation, and (7) content segment group packaging.

According to some embodiments, the authoring device may be selected from a group consisting of: (1) a desktop workstation, (2) a laptop computer, (3) a smartphone, (4) a digital camera, (5) a set-top box, (6) a gaming appliance, and (7) a tablet device.

According to some embodiments, a CAQO of a given template portion may provide authoring device positioning or orientation instructions when acquiring content for a content segment using the given template portion.

According to some embodiments, positioning or orientation instructions may be facilitated by code which accesses one or more sensors of the authoring device.

According to some embodiments, accessed authoring device sensors may include: (1) one or more gravity sensors, (2) a compass, (3) one or more light sensors, and/or (4) one or more accelerometers.

According to some embodiments, portions of a given template are provided to two or more separate authoring devices.

According to some embodiments of the present invention, a system for composing composite content in accordance with a content authoring template, may comprise: a composite content server including storage, processing and communication circuitry adapted to provide to one or more authoring devices at least a portion of the Composite Content Authoring Template (CCAT), wherein each CCAT portion is associated with a given content segment type from a set of possible content segment types and includes one or more Content Acquisition Objects (CAQOs) and one or more Content Authoring Objects (CAOs) adapted to facilitate: (1) acquisition, at the authoring device, of content corresponding to the given content segment type; (2) content segment production at each of the one or more authoring devices; (3) association to a content segment one or more processing indicators defined by the template portion used in producing the content segment; and (4) automated postproduction processing of each of one or more produced content segments.

According to some embodiments, the one or more CAQOs and CAOs may be selected from a group of objects consisting of: (1) constant values, (2) operational variables, (3) executable code, (4) interpreted code, (5) device parameters, (6) written user instructions, (7) audible user instructions or cues, and (8) graphical or video based user instructions.

According to some embodiments, content acquisition may include: (1) acquiring images through an authoring device camera, (2) acquiring images through a camera functionally associated with an authoring device, (3) acquiring audio through an authoring device microphone, (4) receiving user text or graphic input through user interface of the authoring device, and (5) acquiring a user input through any sensor associated with the authoring device.

According to some embodiments, the one or more indicators associated with a content segment may be selected from a group consisting of: (1) metadata, (2) watermarks, (3) audio or video segment timing markers, (4) a filename, (5) a file designator, (6) a pointer, (7) an image processing designator or instruction, (8) an image stitching designator or instruction, (9) a rendered object designator or placeholder, and (10) an image overlay designator or instruction.

According to some embodiments, automated postproduction processing of one or more content segments may include: (1) content segment stitching, (2) content segment element extraction from background, (3) content segment element morphing, (4) content segment element blending, (5) content segment element rendering and/or augmentation, (6) content segment background rendering and/or augmentation, and (7) content segment group packaging.

According to some embodiments, the authoring device may be selected from a group of devices consisting of: (1) a desktop workstation, (2) a laptop computer, (3) a smartphone, (4) a digital camera, (5) a set-top box, (6) a gaming appliance, and (7) a tablet device.

According to some embodiments, a CAQO of a given template portion may provide authoring device positioning or orientation instructions when producing a content segment using the given template portion.

According to some embodiments, positioning or orientation instructions may be supported with user indicators operative using code which accesses one or more sensors of the authoring device.

According to some embodiments, the accessed authoring device sensors may include: (1) one or more gravity sensors, (2) a compass, (3) one or more light sensors, and/or (4) one or more accelerometers.

According to some embodiments, portions of a given template may be provided to two or more separate authoring devices.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method for composing composite content in accordance with a composite content authoring template, said method comprising:
providing to an authoring device at least a portion of the Composite Content Authoring Template (CCAT), wherein the CCAT portion is associated with a given content segment type from a set of possible content segment types and includes one or more Content Acquisition Objects (CAQOs) and one or more Content Authoring Objects (CAOs) and adapted to facilitate acquisition, at the authoring device, of content corresponding to the given content segment type;

producing at least one content segment using the received one or more CCAT portions;

associating to a given content segment one or more processing indicators defined by the CCAT portion used in producing the given content segment; and performing automated postproduction processing of each of one or more produced content segments at least partially based on their respective processing indicators;

wherein the one or more processing indicators associated with a content segment are selected from the group consisting of: (1) metadata, (2) watermarks, (3) audio or video segment timing markers, (4) a filename, (5) a file designator, (6) a pointer, (7) an image processing designator or instruction, (9) a rendered object designator or placeholder, and (10) an image overlay designator or instruction;

wherein automated post production processing of one or more content segments includes: (1) content segment stitching, (2) content segment element extraction from background, (3) content segment element morphing, (4) content segment element blending, (5) content segment element rendering and/or augmentation, (6) content segment background rendering and/or augmentation, and (7) content segment group packaging;

wherein said accessed authoring device sensors include: (1) one or more gravity sensors, (2) a compass, (3) one or more light sensor, and (4) one or more accelerometers; and wherein the authoring device allows multiple users to work on the same Composite Content Authoring Template (CCAT), wherein each user is working on a segment of the same Composite Content Authoring Template (CCAT).

2. The method according to claim 1, wherein the one or more CAQOs and CAOs are selected from the group of objects consisting of: (1) constant values, (2) operational variables, (3) executable code, (4) interpreted code, (5) device parameters, (6) written user instructions, (7) audible user instructions or cues, and (8) graphical or video based user instructions.

3. The method according to claim 1, wherein content acquisition includes: (1) acquiring images through an authoring device camera, (2) acquiring images through a camera functionally associated with an authoring device, (3) acquiring audio through an authoring device microphone, (4) receiving user text or graphic input through user interface of the authoring device, and (5) acquiring a user input through any sensor associated with the authoring device.

4. The method according to claim 1, wherein said authoring device is selected from a group consisting of: (1) a desktop workstation, (2) a laptop computer, (3) a smartphone, (4) digital camera, (5) a set-top box, (6) a gaming appliance, and (7) a tablet device.

5. The method according to claim 4, wherein a CAQO of a given template portion provides authoring device positioning or orientation instructions when acquiring content for a content segment using the given template portion.

6. The method according to claim 5, wherein positioning or orientation instructions are facilitated by code which accesses one or more sensors of the authoring device.

7. The method according to claim 1, wherein portions of a given template are provided to two or more separate authoring devices.

8. A system for composing composite content in accordance with a content authoring template, said system comprising:

a composite content server including storage, processing and communication circuitry adapted to provide to one or more authoring devices at least a portion of the Composite Content Authoring Template (CCAT), wherein each CCAT portion is associated with a given content segment type from a set of possible content segment types and includes one or more Content Acquisition Objects (CAQOs) and one or more Content Authoring Objects (CAOs) adapted to facilitate:

(1) acquisition, at the authoring device, of the content corresponding to the given content segment type;

(2) content segment production at each of the one or more authoring devices;

(3) association to a content segment one or more processing indicators defined by the template portion used in producing the content segment; and (4) automated postproduction processing of each of one or more produced content segments;

wherein the one or more processing indicators associated with a content segment are selected from the group consisting of: (1) metadata, (2) watermarks, (3) audio or video segment timing markers, (4) a filename, (5) a file designator, (6) a pointer, (7) an image processing designator or instruction, (9) a rendered object designator or placeholder, and (10) an image overlay designator or instruction;

wherein automated post production processing of one or more content segments includes: (1) content segment stitching, (2) content segment element extraction from background, (3) content segment element morphing, (4) content segment element blending, (5) content segment element rendering and/or augmentation, (6) content segment background rendering and/or augmentation, and (7) content segment group packaging;

wherein said accessed authoring device sensors include: (1) one or more gravity sensors, (2) a compass, (3) one or more light sensor, and (4) one or more accelerometers; and wherein the authoring device allows multiple users to work on the same Composite Content Authoring Template (CCAT), wherein each user is working on a segment of the same Composite Content Authoring Template (CCAT).

9. The system according to claim 8, wherein the one or more CAQOs and CAOs are selected from the group of objects consisting of: (1) constant values, (2) operational variables, (3) executable code, (4) interpreted code, (5) device parameters, (6) written user instructions, (7) audible user instructions or cues, and (8) graphical or video based user instructions.

10. The system according to claim 9, wherein content acquisition includes: (1) acquiring images through an authoring device camera, (2) acquiring images through a camera functionally associated with an authoring device, (3) acquiring audio through an authoring device microphone, (4) receiving user text or graphic input through user interface of the authoring device, and (5) acquiring a user input through any sensor associated with the authoring device.

11. The system according to claim 8, wherein said authoring device is selected from a group of devices consisting of: (1) a desktop workstation, (2) a laptop computer, (3) a smartphone, (4) digital camera, (5) a set-top box, (6) a gaming appliance, and (7) a tablet device.

12. The system according to claim 11, wherein a CAQO of a given template portion provides authoring device positioning or orientation instructions when producing a content segment using the given template portion.

13. The system according to claim 12, wherein positioning or orientation instructions are supported with user indicators operative using code which accesses one or more sensors of the authoring device.

14. The system according to claim 8, wherein portions of a given template are provided to two or more separate authoring devices.

* * * * *